(No Model.)
2 Sheets—Sheet 2.

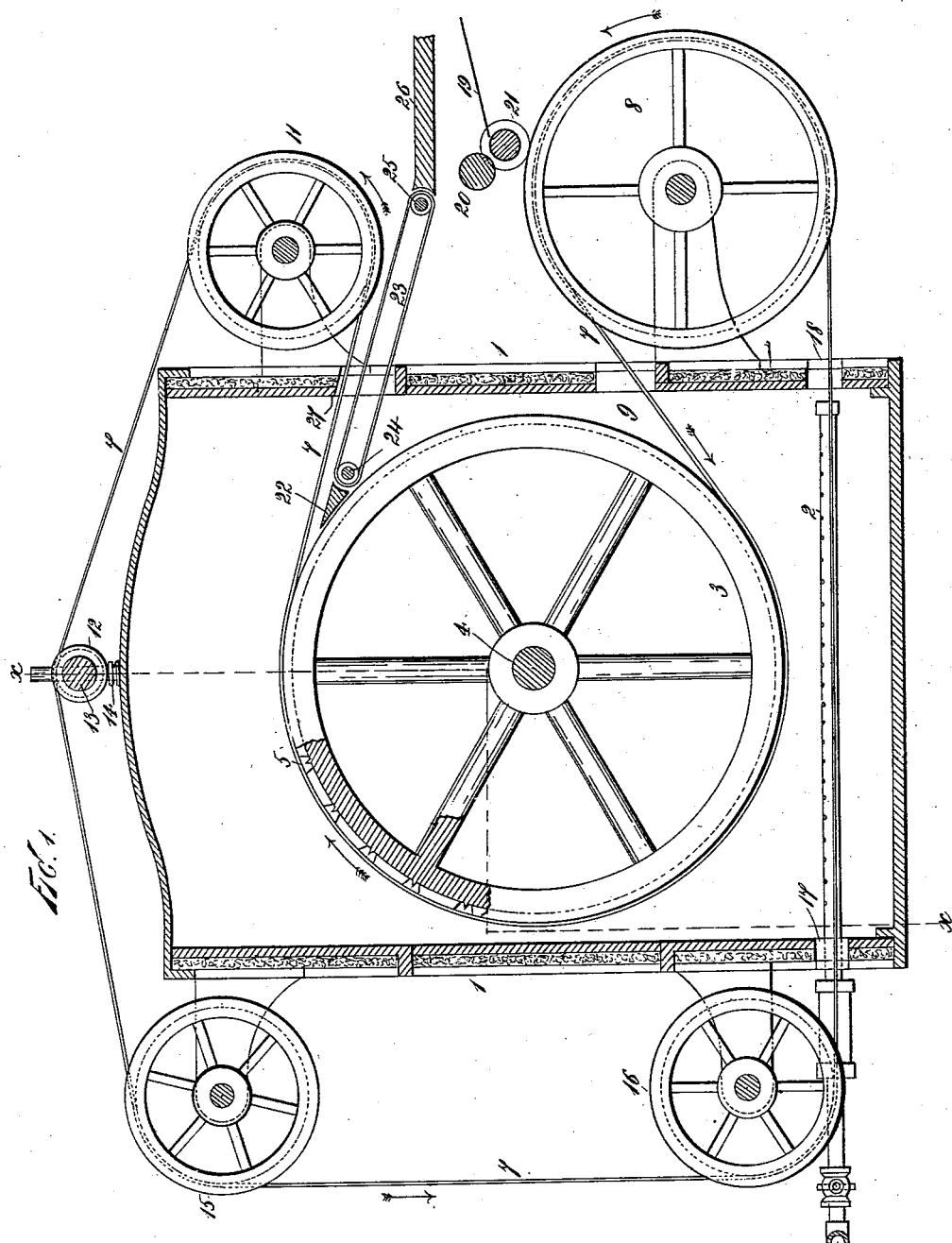

D. M. HOLMES.
WAFFLE OVEN.

No. 562,962.
Patented June 30, 1896.

Witnesses.
John Buckler,
E. D. Wright

Inventor
Daniel M. Holmes,
By A. M. Pierce
Attorney.

UNITED STATES PATENT OFFICE.

DANIEL M. HOLMES, OF ARLINGTON, NEW JERSEY, ASSIGNOR TO THE METROPOLITAN MACHINE WORKS.

WAFFLE-OVEN.

SPECIFICATION forming part of Letters Patent No. 562,962, dated June 30, 1896.

Application filed February 6, 1895. Serial No. 537,437. (No model.)

*To all whom it may concern:*

Be it known that I, DANIEL M. HOLMES, a citizen of the United States, residing in Arlington, Hudson county, State of New Jersey, have invented a new and useful Improvement in Waffle-Ovens, of which the following is a specification.

My invention relates especially to devices employed for baking, particularly articles formed of soft dough, and has for its object the provision of a simple oven whereby waffles, or the equivalent, may be rapidly and effectively baked.

To attain the desired end, my invention consists, essentially, in an inclosed chamber, forming an oven, and provided with means for applying heat; a revoluble wheel mounted in said oven, and a metallic dough-receiving band forming a pan and arranged to pass through said oven, around the wheel therein; and my invention also involves certain other novel and useful combinations or arrangements of parts and peculiarities of construction and operation, all of which will be hereinafter first fully described, and then pointed out in the claims.

Figure 3:
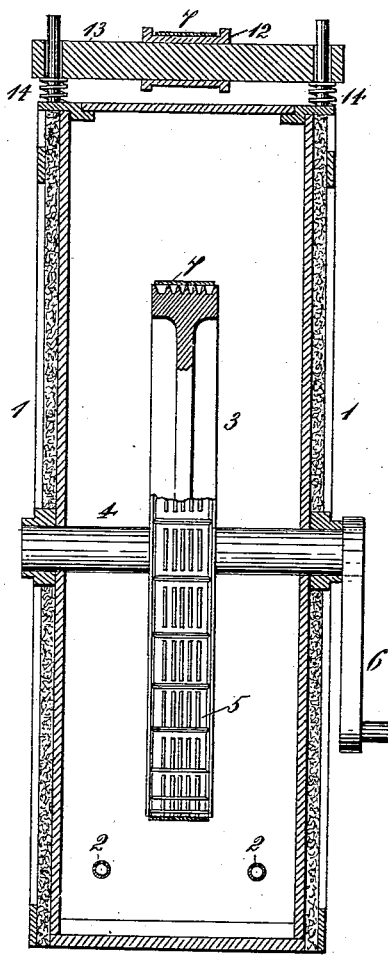
Figure 2:
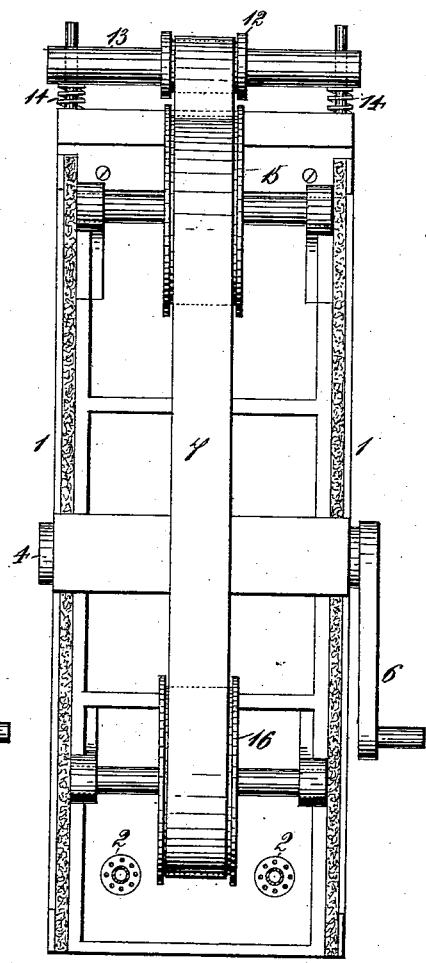

In the accompanying drawings, forming a part hereof, Figure 1 is a side elevation and partial vertical section of an oven embodying my invention. Fig. 2 is an end elevation and partial section, looking from the left of Fig. 1; and Fig. 3 is a vertical sectional view at line $x\,x$ of Fig. 1.

Similar numerals of reference wherever they occur indicate corresponding parts in all the figures.

1 is the exterior wall of the oven, made of any approved material and in any desired manner.

2 2 are gas-burners arranged for heating said oven, but any other method of applying heat may be employed.

3 is a wheel mounted upon a shaft 4, journaled in the side walls of the oven. The periphery of this wheel is preferably provided with indentations or grooves 5.

6 is a crank for revolving the wheel 3 by hand, or power may be applied to the shaft 4.

7 is an endless flexible metallic band passing over an idle-pulley 8 into the oven through a slot 9, around the wheel 3, out of the oven through a slot 27, around an idler 11, and over a tightening-roller 12, the shaft 13 whereof is forced upward by springs 14, over idlers 15 and 16, back through slots 17 and 18 in the oven-wall, to the pulley 8.

19 is a dough-feeding table, and 20 21 are sheeting-rollers.

22 is a stripping-plate.

23 is a carrying-belt passing from the stripping-plate over rollers 24 and 25 to a delivery-table 26.

When constructed and arranged in accordance with the foregoing description, the operation of my waffle oven or machine is as follows: The requisite heat having been obtained, dough is fed on the metallic band or continuous pan 7 from the sheeting-rollers 20 21, or from any other preferred supply. Rotation being imparted to the wheel 3, the endless pan passes around said wheel, the dough being pressed between the band or pan and the periphery of the wheel, entering the depression 5 therein. As the wheel is slowly revolved, the waffles, or the equivalent, are quickly and thoroughly baked, and when they reach the stripper 22 they pass thereover onto the band 23 to the delivery-table 26.

It will thus be seen that my improved waffle-oven provides very simple and effective means for producing goods of this class, the baking being regulated to a nicety and the cakes delivered in a continuous sheet.

Having now fully described my invention, what I claim as new therein, and desire to secure by Letters Patent, is—

1. A machine for cooking waffles, or the equivalent, in which is comprised an oven, and means for heating the same; a revoluble wheel having depressions in its periphery mounted within said oven; an endless, flexible band or pan passing around said wheel and pressing closely against it, and means for supplying dough to said band and removing the goods therefrom after baking, substantially as shown and described.

2. In a device of the character herein specified, an oven wherein is revolubly mounted a wheel, the periphery whereof is provided with depressions, as set forth, in combination with an endless metal band, and means for causing said band to enter the oven, pass around said wheel, pressing closely against it and then emerge from the oven, substantially as shown and described.

3. A waffle-machine in which is comprised an oven and means for heating the same; a revoluble wheel mounted within the oven and having depressions in its periphery; a series of idle-pulleys located upon the exterior of the oven; a flexible, metallic band passing over said pulleys, into the oven, and around the wheel, pressing closely against it therein; means for supplying a continuous sheet of dough to the band as it passes into the oven, and for removing the completely-cooked goods from said band and depositing them upon a receiving-table, substantially as shown and described.

DANIEL M. HOLMES.

Witnesses:
A. M. PIERCE,
E. D. WRIGHT.